(12) United States Patent
Kalwa et al.

(10) Patent No.: US 12,508,800 B2
(45) Date of Patent: Dec. 30, 2025

(54) METHOD FOR PRODUCING A VENEERED BOARD

(71) Applicant: Flooring Technologies Ltd., Kalkara (MT)

(72) Inventors: Norbert Kalwa, Horn—Bad Meinberg (DE); Joachim Hasch, Berlin (DE)

(73) Assignee: Flooring Technologies Ltd., Kalkara (MT)

( * ) Notice: Subject to any disclaimer, the term of this patent is extended or adjusted under 35 U.S.C. 154(b) by 159 days.

(21) Appl. No.: 17/776,323

(22) PCT Filed: Nov. 5, 2020

(86) PCT No.: PCT/EP2020/081195
§ 371 (c)(1),
(2) Date: May 12, 2022

(87) PCT Pub. No.: WO2021/094199
PCT Pub. Date: May 20, 2021

(65) Prior Publication Data
US 2022/0402161 A1 Dec. 22, 2022

(30) Foreign Application Priority Data
Nov. 12, 2019 (EP) ..................... 19208677

(51) Int. Cl.
*B32B 21/14* (2006.01)
*B27D 1/04* (2006.01)
(Continued)

(52) U.S. Cl.
CPC ............. *B32B 21/14* (2013.01); *B27D 1/04* (2013.01); *B27D 3/00* (2013.01); *B32B 21/13* (2013.01);
(Continued)

(58) Field of Classification Search
None
See application file for complete search history.

(56) References Cited

U.S. PATENT DOCUMENTS 3,817,822 A    6/1974   Dawes
5,633,299 A * 5/1997   Van Druten ............ C08L 97/02
                                               524/13
(Continued)

FOREIGN PATENT DOCUMENTS

CN       102414032 A    4/2012
CN       106457781 A    2/2017
(Continued)

OTHER PUBLICATIONS

Wen, Z., Process for Producing Multilayer Solid Wood, Nov. 24, 2007, machine translation of CN 107379197 (Year: 2017).*
(Continued)

*Primary Examiner* — Chinessa T. Golden
(74) *Attorney, Agent, or Firm* — Bachman & LaPointe, P.C.

(57) ABSTRACT

A method for producing a veneered board having a veneer and a carrier board, to provide a veneered board having improved use properties. The method includes: providing a veneer having an upper face and a lower face, applying an additive onto the lower face of the veneer, applying a binder onto the lower face of the veneer, heating the binder, producing a stack of materials to be pressed, having a carrier board and a veneer provided with an additive and a binder on its lower face, wherein the lower face of the veneer lies on the carrier board, pressing the stack of materials to be pressed in order to form a veneered board.

5 Claims, 1 Drawing Sheet

(51) Int. Cl.
  *B27D 3/00* (2006.01)
  *B32B 21/13* (2006.01)
  *B32B 37/06* (2006.01)
  *B32B 37/10* (2006.01)
  *B32B 21/02* (2006.01)

(52) U.S. Cl.
  CPC ............. *B32B 37/06* (2013.01); *B32B 37/10* (2013.01); *B32B 21/02* (2013.01); *B32B 2255/08* (2013.01); *B32B 2255/26* (2013.01); *B32B 2255/28* (2013.01); *B32B 2264/0214* (2013.01)

(56) References Cited

U.S. PATENT DOCUMENTS

2012/0308724 A1* 12/2012 Hellring .................. C09D 5/32
  427/160
2017/0190156 A1 7/2017 Lundblad et al.

FOREIGN PATENT DOCUMENTS

| CN | 107379197 A | * | 11/2017 |
| DE | 10300247 B4 | | 7/2004 |
| EP | 2927018 A1 | | 10/2015 |

OTHER PUBLICATIONS

Office Action dated Jan. 19, 2023 for corresponding appication CN202080079652.2.
International search report for patent application No. PCT/EP2020/081195 dated Feb. 1, 2021.

\* cited by examiner

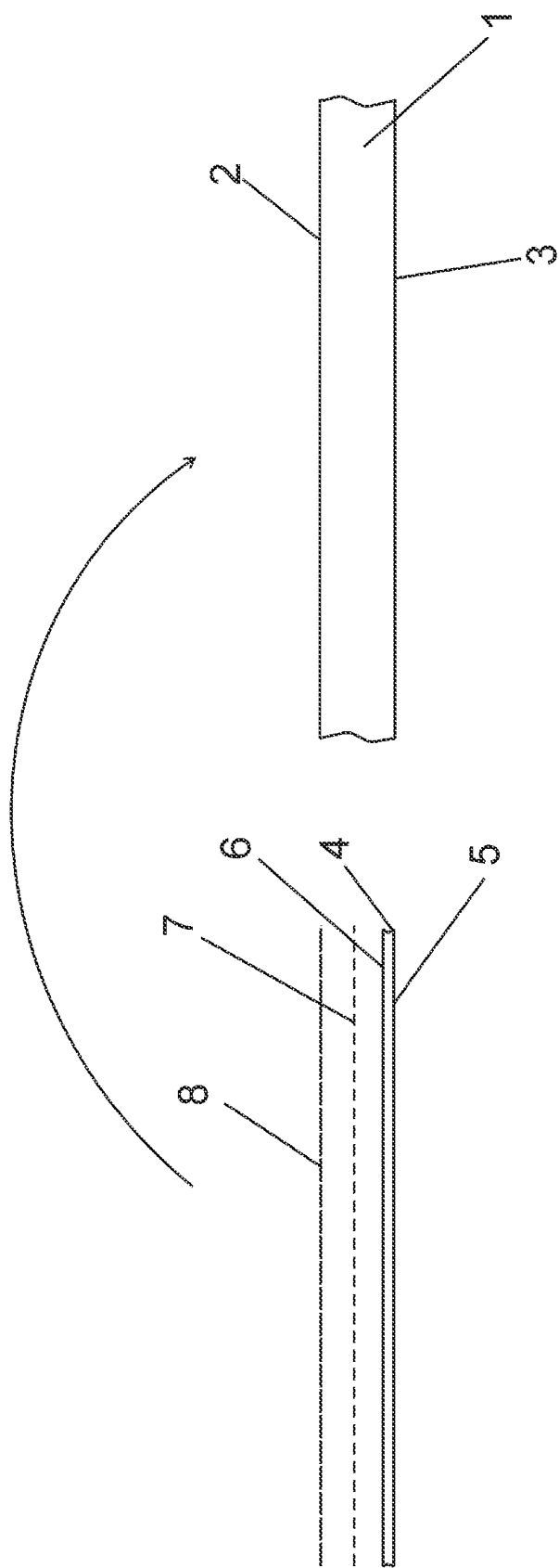

METHOD FOR PRODUCING A VENEERED BOARD

BACKGROUND OF THE INVENTION

The invention relates to a method for producing a veneered board and to a veneered board.

Veneered boards give the impression of a real wood surface, but are very economical on account of the sparing use of thin veneer layers in conjunction with a carrier board. A typical veneered board, in which the veneer is fixed on the carrier board by means of a sheet of paper impregnated with synthetic resin, is presented in EP 2 902 196 A1 and DE 103 00 247 B4.

The disadvantage of the known veneered boards is that the structure of the veneered board is complex and that the properties of the veneer can only be improved to a very limited extent.

US 2017/190156 A1 describes mixing additives into the binder, which serves to fix a veneer to a carrier board. In this case, too, the properties of the veneer can only be improved to a very limited extent.

From U.S. Pat. No. 3,817,822 A a process for the production of fire-retardant plywood panels is known. In this process, plies of wood sheet are first impregnated with an aqueous solution of a fire-retardant salt. These plies of wood sheet are then dried and stacked, with a film of polyethylene placed between each the plies of wood sheet. The stack is then hot pressed under pressure.

Finally, a process for printing wood-based boards is known from EP 2 927 018 A1. It comprises the application of a primer to the wood-based boards, the application of at least one functional layer to the wood-based boards by means of a digital printer and/or 3D printer, the application of at least one decorative layer to the at least one functional layer by means of a digital printer and/or 3D printer, and the application with subsequent drying and/or gelling of at least one protective layer.

SUMMARY OF THE INVENTION

The object of the invention is therefore to provide a method for producing a simply constructed veneered board that makes it possible to improve the properties of the veneer more easily.

This object is achieved with a method as disclosed herein as well as with a veneered board also as disclosed herein.

The method according to the invention for producing a veneered board comprising a veneer and a carrier board takes place with the steps of:
  providing a veneer having an upper face and a lower face,
  applying an additive onto the lower face of the veneer,
  applying a particulate binder onto the lower face of the veneer,
  heating the particulate binder, after application onto the veneer, in order to soften the particulate binder
  optionally, storing the veneer,
  producing a stack of materials to be pressed, having a carrier board and a veneer provided with an additive and a binder on its lower face,
  wherein the lower face of the veneer lies on the carrier board,
  pressing the stack of materials to be pressed into a veneered board by liquefying and curing the binder at increased temperature and increased pressure.

Any board that is flat on at least one side and that enters a permanent connection with a binder may be used as the carrier board. Preferably, wood composite boards are used, e.g. medium-density or high-density fiberboards (MDF, HDF), chipboards, OSB boards, solid wood boards, plywood, blockboards or laminboards, but cement-bonded chipboards or fiberboards, including chipboards with a high content of binder, as well as biocomposite boards and water-resistant boards are also suitable. Water-resistant boards are boards, also wood composite boards, that hardly deform or do not deform at all under the influence of water and that, in particular, do not swell or hardly swell. The carrier board has an upper face, on which the veneer is applied, and a lower face, on which a backing is optionally applied.

Sheets of real wood that have a thickness of up to 10 mm, preferably, however, 0.2 mm to 5 mm, in particular 0.5 mm to 2 mm, are used as veneer. The veneer may be produced in one piece from a log by means of slicing or peeling. However, it may also be composed of individual pieces that, for example, are interconnected by means of binder or a glue thread. Generally, the veneer has a moisture content of at most 20 wt. %, preferably at most 12 wt. %, in particular at most 8 wt. %. The veneer preferably has the dimensions of the carrier board. The veneer comprises a lower face facing the carrier board and an upper face facing away from the carrier board.

Various substances or compounds may be applied onto the binder as an additive, either individually or in a mixture or one after the other. The following are suitable as an additive, for example: flame retardants such as e.g. ammonium phosphates or water glass, a UV stabilizer, an infrared absorber, agents for increasing the conductivity, antibacterial agents, hydrophobizing agents or stain. Depending on the required or desired property, any other additives may, of course, also be considered. The additive may be present as a solid, preferably as a particulate solid, e.g. dust or powder, but also as a granular material. Alternatively, a liquid or paste-like additive may be used. However, the additive may also be soluble in the binder; in this case, the additive may not be completely transported to the surface. It is a question of the dose of the additive.

According to a development of the invention, the additive is insoluble in the binder or, alternatively, is not homogeneously soluble in the binder. In this way, it is ensured that the additive does not mix with the binder and, as result, lose effectiveness, but rather remains on the surface of the binder and, as a result, comes into contact as fully as possible with the veneer.

The binder is preferably a thermosetting resin, in particular an aminoplastic or phenol-based resin. In the following, the binder is also referred to as synthetic resin. Typically, melamine resin, phenol resin, urea resin or mixtures of said resins are used. The synthetic resin is applied onto the veneer in an amount of 100 to 200 $g/m^2$. The amount of synthetic resin applied depends, inter alia, on the thickness of the veneer. The synthetic resin is used in an amount that ensures that the synthetic resin penetrates the veneer at least in sections and, as a result, the additive is transported into the veneer, potentially up to the upper face of the veneer. The synthetic resin is preferably used as a solid, in particular in the form of dust or powder or as a granular material, wherein the synthetic resin is applied, in particular sprinkled or sprayed, onto the lower face of the veneer provided with an additive. Preferably, Tribo pistols are used to apply the synthetic resin. However, it is also possible that a first portion of the synthetic resin is applied in powder form and a second portion of the synthetic resin is applied in liquid form.

According to the invention, firstly, the additive is applied onto the lower face of the veneer. Advantageously, the lower face of the veneer faces upward when the additive is applied, such that the additive lies on the lower face of the veneer. After application of the additive or after application of a mixture of additives or after successive applications of multiple additives, the additive can optionally be fixed, e.g. by means of drying or heating. For example, liquid additive, e.g. ink, can be dried. It has been shown that, in spite of the fixation of the additive during the pressing process, when the synthetic resin is liquefied prior to curing and penetrates the veneer at least in sections, the additive is transported by the synthetic resin through the veneer, and therefore an aesthetic effect, for example, is reliably achieved with little use of additive.

Subsequently, synthetic resin is applied onto the veneer. The synthetic resin can be applied in liquid form, e.g. sprayed or poured on. Preferably, however, the synthetic resin is applied as a solid, in particular in the form of particles, e.g. as dust, powder or granular material. The use of synthetic resin in the form of particles is known from WO 2010/121971 A2, but in that case is applied onto paper.

In order to improve the adhesion of the additive and synthetic resin to the veneer, the synthetic resin is heated after being applied onto the veneer, such that the particles of the synthetic resin soften at least on the surface and adhere to one another. The heating may, for example, take place in a known tunnel furnace, preferably with infrared radiators, in order to prevent the particles of the synthetic resin from being swirled up by air movements. Since the additives are generally applied in small amounts, particles also adhere to the veneer when the synthetic resin is heated, such that the additives and synthetic resin are securely bonded to the veneer.

When the additive and synthetic resin are fixed on the veneer in this manner, the veneer can be stored. However, the veneer can also be processed further. For this purpose, the lower face of the veneer is laid on a carrier board. The synthetic resin lies on an upper face of the carrier board, the additive lies on the synthetic resin, and the veneer lies on the additive as the outer layer. The carrier board and the veneer provided with additive and synthetic resin are therefore layered into a stack of materials to be pressed, wherein a lower face of the veneer provided with synthetic resin and additive lies on an upper face of the carrier board.

Optionally, a backing may be arranged on the lower face of the carrier board. The backing is intended to compensate for tensile forces that are caused by the veneer on the upper face of the carrier board. The backing is generally a sheet of paper or paperboard impregnated with synthetic resin, but it could also be a veneer or another planar layer that is bonded to the lower face of the carrier board in a planar manner. Preferably, a backing that is similar or comparable to the layer on the upper face of the carrier board is used. Advantageously, a veneer that is coated with synthetic resin and optionally also with an additive is therefore used in connection with the invention.

The stack of materials to be pressed is pressed into a veneered board. In the press, the synthetic resin is liquefied under the influence of increased temperature and increased pressure, it chemically cures and solidifies when cooled. The pressing time is typically between 20 seconds and 60 seconds. The pressing temperature is usually between 100° C. and 240° C., preferably between 160° C. and 200° C. The pressing pressure is between 25 N/mm² and 50 N/mm². During the pressing process, the liquefied synthetic resin penetrates into the veneer. Unlike the dense surface of the carrier board, the veneer comprises cavities, on the one hand cracks and fissures induced during production but also cavities that are typical for wood, e.g. due to veins that have been cut into. The synthetic resin penetrating into the veneer causes the veneer to become firmly bonded to the carrier board.

This description clearly shows that the production of the veneered board according to the invention takes place using only two components, i.e. the veneer coated with additive and synthetic resin and the carrier board. As a result, the stack of materials to be pressed is particularly easy to produce. In the case of two layers, there is no risk of the layers slipping or sliding relative to one another, and therefore fewer rejects will be produced during production. Nevertheless, all use properties of the veneer can be adjusted as desired, i.e. the veneered board may be provided with a wide range of properties. The additive lying on the synthetic resin in the stack of materials to be pressed is conveyed through the veneer during the pressing process substantially without mixing with the synthetic resin and can therefore exert its effect directly where required without major losses.

The invention additionally relates to a veneered board, comprising a water-resistant carrier board and a real wood veneer arranged above the carrier board, characterized in that the real wood veneer is impregnated with synthetic resin, and in that additives are present on the upper face of the synthetic resin in the real wood veneer. The additives, which improve the use properties of the veneer, are predominantly found in the veneer. The synthetic resin is substantially free of additive. According to the invention, the synthetic resin is also free of wood flour, wood fibers or other wood particles.

According to another embodiment, the veneered board comprises a backing on the lower face of the carrier board. The backing may be a sheet of paper impregnated with synthetic resin or a sheet of cardboard or paperboard impregnated with synthetic resin, but is preferably also designed as a veneer. The backing is pressed with the carrier board as a component of the stack of materials to be pressed and prevents the veneered board from warping, because approximately equal forces are now acting on both sides of the carrier board. If a veneer is used as the backing, it may also be provided with an additive and synthetic resin in the same way as described above for the veneer on the upper face of the carrier board.

Any board that has a flat surface may be used as the carrier board. Preferably, the carrier board is a wood composite board or a biocomposite board, as described above.

BRIEF DESCRIPTION OF THE DRAWINGS

Details of the invention are explained in greater detail below using exemplary embodiments. In the FIGURE:

FIG. 1 is a schematic representation of the layers of a carrier board according to the invention.

DETAILED DESCRIPTION

The components of the veneered board are a carrier board 1 having an upper face 2 and a lower face 3. Furthermore, a veneer 4 with a lower face 5 and an upper face 6 is a component of the veneered board. The veneer is prepared before a stack of materials to be pressed is built up in layers. This is done by arranging the lower face 5 of the veneer pointing up. Firstly, an additive 7 is applied onto the lower face of the veneer 4. Alternatively, a mixture of additives may be applied or multiple additives are applied in succession. Once the additive 7 has been applied, a layer of synthetic resin 8 is applied. In this case, the synthetic resin 8 is used as a solid, specifically a particulate solid. The synthetic resin 8 is sprayed on by means of Tribo pistols.

Following on the application of the synthetic resin 8, the veneer 4 with the additive 7 applied onto the lower face 5 of the veneer 4 and the synthetic resin 8 applied on the additive 7 is heated. In the process, at least the surface of the synthetic resin 8 softens such that the individual particles adhere to one another. Depending on the extent of the heating, the synthetic resin may also flow so as to form a layer. However, it does not cure due to heating, but rather remains reactive. Since synthetic resin particles 8 are also in contact with the additive 7 and the lower face 5 of the veneer, the additive 7 is also bonded to the lower face 5 of the veneer 4. After the synthetic resin 8 and additive 7 have bonded to the veneer 4 in this manner, the veneer 4 can be stored or immediately processed further.

The further production of the veneered board takes place in that the lower face 5 of the veneer 4 is laid on the upper face 2 of a carrier board, thus creating a stack of materials to be pressed. The stack of materials to be pressed is pressed into a veneered board. Optionally, the stack of materials to be pressed is supplemented by a backing, which is applied onto the lower face 3 of the carrier board 1 and which then forms the lower face of the veneered board 1. According to an advantageous embodiment, the backing is designed in the same manner as the veneer 4 coated with additive on the upper face of the carrier board. However, in principle, any layer on the lower face of the carrier board that absorbs at least some of the forces that are exerted by the veneer 4 arranged on the upper face 2 of the carrier board 1 is suitable as the backing.

Exemplary Embodiment 1—Applying Ink

Sheets of veneer made of oak (0.8 mm thickness) are placed on a transport belt with the lower face facing upward. In a first treatment station, liquid black digital printing ink (dilution 1:10) is sprayed on by means of a spraying bar in an amount of 5 g/m² and dried with the aid of an IR radiator. Subsequently, in a second treatment station, 120 g/m² of synthetic resin, in this case melamine resin, is applied as a solid to the digital printing ink by means of Tribo pistols. The resin is fixed by means of the electrostatic charging. The synthetic resin is surface-fused with the aid of an IR radiator, such that the resin does not come off or respectively trickle down when the sheet of veneer is handled. The sheet of veneer is then turned again such that the additive and synthetic resin on the lower face point downward.

A second sheet of veneer (birch, thickness 0.8 mm) as the backing is provided with the same amount of melamine resin as described above for the veneer that is applied onto the upper face of the carrier board, and the resin is in turn heated such that it flows and gels.

A high-density fiberboard (HDF board) with a thickness of 12 mm is used as the carrier board.

Subsequently, the following stack of materials to be pressed is built up in layers (listed in order from top to bottom):
Oak veneer
HDF 12 mm
Birch veneer The two veneers are each arranged such that the layer of synthetic resin faces the carrier board.

The stack of materials to be pressed is pressed into a veneered board in a short-cycle press (SC press) at a pressing temperature of 200° C. and a pressing pressure of 40 kg/cm² with a pressing time of 45 seconds. Alternatively, the stack of materials to be pressed may be pressed in the short-cycle press into a veneered board at a pressing temperature of 180° C., a pressing pressure of 30 N/mm² and a pressing duration of 30 seconds.

After the press is opened, a significant blackening can be seen in the pores of the oak veneer in the veneered board on account of the black ink that was transported through the veneer by the liquefied synthetic resin in spite of drying in the press. However, no melamine resin was visible on the surface of the veneer. The veneered board showed a dyed real wood surface.

According to an alternative of exemplary embodiment 1, part of the synthetic resin can be used in liquid form. A typical application sequence for the synthetic resin may, for example, provide that the additive is applied onto the veneer first. Subsequently, a first portion of the synthetic resin is applied in powder form onto the additive. A second portion of the synthetic resin is then applied in liquid form. Subsequently, the synthetic resin is dried but not cured. Curing takes place, as described above, in the press.

Exemplary Embodiment 2—Increasing the Conductivity

| Starting materials: | | |
|---|---|---|
| Veneer for the upper face: | Thickness: | 0.8 mm |
| | Type: | Oak |
| Additive: | Aquacyl AQ 0302 (3%) | 30 g/m² |
| | Applied by means of spraying (*1) (*2) | |
| Synthetic resin: | Melamine resin | |
| | Resin application: | 600% or 120 g/m² |
| Carrier board: | High-density fiberboard: | HDF |
| | Thickness: | 12 mm |
| Backing: | Type: | Veneer, birch |
| | Thickness: | 0.8 mm |
| | Resin application: | 600% |
| | Synthetic resin: | Melamine resin |

(*1) The product Aquacyl AQ 0302 is an aqueous dispersion of multi-wall carbon nanotubes.
(*2) Figures given in "%" in this text without further explanation are percentages by weight.

The veneer is produced, with the application of an additive and synthetic resin, as described above for exemplary embodiment 1. However, an aqueous, 3% dispersion of multi-wall carbon nanotubes is sprayed on as the additive, for example by means of a nozzle arrangement that extends across the width of the carrier board. Fixation of the additive is dispensed with here.

The backing is also produced as described for exemplary embodiment 1. The carrier board and the oak veneer are layered onto the backing in order to form a stack of materials to be pressed. Said stack of materials to be pressed is pressed in an SC press at a temperature of 180° C. and a pressure of p=30 N/mm² for a pressing time of 50 seconds. The veneered board produced in this manner shows a real wood surface; the synthetic resin is not visible on the surface.

For comparison, a board with otherwise the same structure and production was produced without the additive Aquacyl AQ0302 on the veneer impregnated with synthetic resin.

In this exemplary embodiment, a press plate with an embossed wood texture was also used to provide texture. The wood texture of the press plate was recognizable as a negative in the veneer. After the veneered board had cooled, in both specimens with and without additive, the surface resistance was determined in accordance with DIN EN 1081: 2018 following climatization (48 h, 23° C., 50% relative air humidity). A value of $3\times10^{11}\Omega$ was determined for the sample without Aquacyl AQ 0302. For the sample with the additive, $5\times10^{8}\Omega$ was measured.

Additionally, for the sample with the additive, approx. 0.2 mm of the veneer surface was additionally sanded off using a belt sander in another sample. A repeat measurement of the surface resistance produced $5.5\times10^{8}\Omega$. The surface resistance can therefore be reduced by approx. three powers of ten compared with the control sample by using Aquacyl AQ 0302 with carbon nanotubes. The conductivity of the veneered upper face of the veneered board is thus substantially improved, despite making sparing use of the additive. It has proven advantageous that the additive is conveyed in a targeted manner into the veneer and to the surface of the veneer by being applied onto the sticky surface of the synthetic resin and by being conveyed by means of the synthetic resin during the pressing.

Exemplary Embodiment 3—Improving the Light-Fastness

| Starting materials: | | |
|---|---|---|
| Veneer for the upper face: | Thickness: | 0.8 mm |
| | Type: | Oak |
| | Resin application: | 600% or 120 g/m² |
| | Synthetic resin: | Melamine resin |
| Additives: | Lignostab 1198 (10% solution) | 2 g/m² |
| | Tinuvin 292 (10% solution) | 2 g/m² |
| | Applied one after the other by means of spraying | |
| Carrier board: | High-density fiberboard: | HDF |
| | Thickness: | 12 mm |
| Backing: | Type: | Veneer, birch |
| | Thickness: | 0.8 mm |
| | Resin application: | 600% |
| | Synthetic resin: | Melamine resin |

The veneer impregnated with synthetic resin and the backing were produced in the same manner as described for exemplary embodiment 1. Two additives were applied onto the veneer one after the other, i.e. a 10% solution of Lignostab and a 10% solution of Tinuvin, each in an amount of 2 g/m². The amount applied is so small that fixation is dispensed with.

The stack of materials to be pressed, which, apart from the additives, has the same structure as in the previous exemplary embodiments, is pressed in an SC press at a temperature of 180° C., a pressure of p=30 N/mm² and with a pressing time of 50 seconds. The resulting veneered board shows a real wood surface; the synthetic resin is not visible on the surface.

For comparison, an otherwise identical, veneered board without additives (Lignostab 1198 and Tinuvin 292) was produced on the overlay.

A press plate with a wood texture was used to provide texture. The wood texture of the press plate was visible in the veneer of the veneered board.

Subsequently, a light-fastness test according to DIN EN ISO4892-2, 2013-06 (600 h) was performed. The comparison board (control sample) without the two additives was also tested. In the case of the veneered board according to the invention with the additives resulted in ΔE<1.5, and the sample without agent resulted in an ΔE of 4. The veneered board according to the invention is therefore far more stable than a comparison board without additives. In this case, too, it was found that the additives lie on the surface of the liquefied synthetic resin and are conveyed into or through the veneer during the pressing.

Exemplary Embodiment 4—Veneer on Both Sides of the Carrier Board

| | | |
|---|---|---|
| Veneer for the lower and upper face: | Thickness: | 0.8 mm |
| | Type: | Oak |
| | Resin application: | 600% or 120 g/m² |
| | Synthetic resin: | Melamine resin |
| Carrier board: | High-density fiberboard: | HDF |
| | Thickness: | 6 mm |

In each case, a veneer made of oak for the upper face of the carrier board and a veneer made of oak for the lower face of the carrier board is provided with synthetic resin, as described for exemplary embodiment 1. An additive is placed on the synthetic resin. In this connection, a dye, a pigment, an effect pigment, e.g. metal pigments or reflective pigments, flame retardants such as boron compounds or water glass, ink, a UV stabilizer, an infrared absorber, agents for increasing the conductivity, antibacterial agents, hydrophobizing agents, bleaching agents or stain may be used as the additive.

The additive may be present as a solid, preferably as a particulate solid, e.g. as dust or powder, but also as granular material. Alternatively, a liquid or paste-like additive may be used. However, the additive may also be soluble in the binder; in this case, the additive may not be completely transported to the surface. It is a question of the dose of the additive. The amount to be used depends on the desired technical or aesthetic effect and can be determined within few experiments.

In this case, the carrier board is a HDF board that is thin compared with the previous exemplary embodiments, with a thickness of 6 mm. Thin carrier boards are particularly suitable for equipping vehicles, e.g. for the interior finishing of driver's cabs, camper vans, motor homes, airplanes or boats, in particular cruise ships.

In principle, other thin boards of sufficient strength may be used as an alternative, e.g. water-resistant boards with minimal swelling and shrinkage, which are also suitable for use in humid spaces such as swimming pools or saunas, but also bathrooms and kitchens, in particular water-resistant MDF boards or fiberboards with a high content of binder. The following exemplary embodiments demonstrate this possibility.

Exemplary Embodiment 5—Water-Resistant Board

| Starting materials: | | |
|---|---|---|
| Veneer for the upper face: | Thickness: | 0.8 mm |
| | Type: | Oak |
| Synthetic resin: | Synthetic resin application: | 120 g/m² |
| | Synthetic resin: | Melamine resin |
| Additive: | Digital printing ink, liquid black, aqueous, applied by means of spraying: | 5 g/m² |
| Carrier board: | Board consisting of 55 wt. % melamine resin and 45 wt. % wood fibers | |
| | Thickness: | 5.8 mm |

| Starting materials: | | |
|---|---|---|
| Backing: | Synthetic resin: | 120 g/m² |
| | Veneer as outer layer: | Birch |
| | Thickness: | 0.8 mm |

Sheets of veneer made of oak with a thickness of 0.8 mm and made of birch with a thickness of 0.8 mm are prepared as described for exemplary embodiment 1, i.e. they are provided with an additive and with synthetic resin in solid, not liquid, form.

A water-resistant board with a thickness of 5.8 mm, in which the proportion of synthetic resin, in this case melamine resin, outweighs the proportion of wood fibers, is used as the carrier board.

Producing the Veneered Board

Backing A backing of birch veneer, a carrier board and an oak veneer are layered in order to form a stack of materials to be pressed. In this case, the veneers provided as described above with synthetic resin and, in the case of the oak veneer, also with the additive are used. The side of the veneer that is coated with synthetic resin faces the carrier board in each case.

The stack of materials to be pressed is introduced into an SC press (short-cycle press), where it is pressed at a temperature of 180° C. and a pressure of p=30 N/mm² for a pressing time of 30 seconds. It can be pressed with a simple, smooth press plate. However, in this embodiment, textured press plates may also be used to provide texture. For example, a press plate with a wood texture may be used.

After the pressing, black color seepage could be observed in the pores of the veneer and in the veneer flaws (knotholes, etc.). The wood texture of the press plate was visible in the veneer. No visible layer of melamine resin had formed on the upper face of the veneer. Visible discoloration was solely produced by the additive, in this case the black ink. The black ink was therefore conveyed through larger openings in the veneer or between the fibers of the veneer to the surface of the veneer by means of the liquefying synthetic resin during the pressing process. Thereafter, the boards were finished with a UV varnish or UV oil in the surface. The amounts applied were based on the desired use class. The veneer surface has therefore been accentuated or respectively designed in a manner that was not possible previously. The method according to the invention offers better design properties and thus use properties for a veneered board.

Exemplary Embodiment 6

Water-Resistant Board with Digitally Printed Veneer

| Starting materials: | | |
|---|---|---|
| Veneer for the upper face: | Thickness: | 0.8 mm |
| | Type: | Oak, natural, witout knotholes |
| Synthetic resin: | Synthetic resin: | Melamine resin |
| | Resin application: | 120 g/m² |
| Additive: | Digital printing ink, liquid black, aqueous, applied by means of spraying: | 5 g/m² |
| Carrier board: | Board consisting of 55 wt. % melamine resin and 45 wt. % wood fibers | |
| | Thickness: | 5.8 mm |
| | Format: | 2800 × 2060 mm |

| Starting materials: | | |
|---|---|---|
| Backing: | Synthetic resin application: | 120 g/m² |
| | Veneer: | Birch |
| | Thickness: | 0.8 mm |

The veneer is prepared as described for exemplary embodiment 1.

Producing the Veneered Board

A backing of birch veneer, a carrier board, and an oak veneer are layered into a stack of materials to be pressed.

The stack of materials to be pressed is introduced into an SC press (short-cycle press), where it is pressed at a temperature of 180° C. and a pressure of p=30 N/mm² for a pressing time of 30 seconds. It can be pressed with a simple, smooth press plate. However, in this embodiment, textured press plates may also be used to provide texture. For example, a press plate with a wood texture may be used. The wood texture of the press plate was visible in the veneer. No visible layer of melamine resin had formed on the upper face of the veneer.

Subsequently, knotholes or veneer flaws (cracks, etc.) were printed on the veneer at random using a digital printer, wherein one imprint is present on at least each plank which later is cut from the large format (1400×195 mm). The boards were then finished with a UV varnish or UV oil in the surface. The amounts applied were based on the desired use class. The method according to the invention offers better design properties and thus use properties for a veneered board.

The four exemplary embodiments mentioned exhibit only a small selection of the possibilities offered by this method. To improve the properties of the veneers used, no intensive surface treatment and no "dip impregnation" is required. The melamine resin penetrating into the veneer serves as a substrate or respectively transport medium for the additives or respectively agents. At the same time, a distribution of the agent is achieved in the veneer cross-section.

Furthermore, the boards with the veneer surfaces may, of course, also be used to produce wall or ceiling paneling. It is also possible to use the boards for the production of furniture, interior elements such as partition walls, changing cubicles, etc., as well for vehicle fittings or outdoor furniture. In addition, this technology can also cover special applications in which product properties that were not achievable before with wood surfaces are required. These may be, for example, resistance to moisture, cleanability/disinfectability, scratch resistance, etc. By virtue of the method, a veneer/wood surface that has the properties of a melamine resin surface is obtained. Said surface is known for its good resistance to mechanical, chemical and thermal stresses. By controlling the flow of melamine resin, it is possible to achieve the properties of a melamine resin surface without it actually being visible. Specifically, when the melamine resin rises to the surface, the appearance of the veneer changes from wood-like, i.e. natural, to plastic-like. This effect is undesirable and is avoided here according to the invention. Some examples of possible applications include partition walls in sanitary/changing areas, the vehicle sector, payment counters, outdoor furniture, etc. Of course, this list is not exhaustive and illustrates only some possible applications.

The invention claimed is:

1. A veneered board, composed of a carrier board (1) and a veneer (4) arranged above the carrier board (1), and optionally a backing, wherein the veneer (4) is impregnated with a binder (8) that is substantially free of additives and wherein additives (7) are present on an upper face of the binder (8) in the veneer (4), wherein the additives (7) comprise one of the substances or a mixture of two or more of the substances from the following group: UV stabilizer, infrared absorber, hydrophobizing agents.

2. The veneered board of claim 1, wherein the board comprises the backing.

3. The veneered board of claim 1, wherein the additives (7) further comprise one of the following substances or a mixture of two or more of the following substances: dye, pigment, effect pigment, flame retardant, ink, UV stabilizer, infrared absorber, agents for increasing the conductivity, hydrophobizing agents, bleaching agents.

4. The veneered board of claim 1, wherein the additives (7) comprise UV stabilizer.

5. The veneered board of claim 1, wherein the additives (7) comprise infrared absorber.

\* \* \* \* \*